US008482272B2

(12) United States Patent
Murase

(10) Patent No.: US 8,482,272 B2
(45) Date of Patent: Jul. 9, 2013

(54) DC-DC CONVERTER

(71) Applicant: Murata Manufacturing Co., Ltd., Nagaokakyo (JP)

(72) Inventor: Motonori Murase, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/735,154

(22) Filed: Jan. 7, 2013

(65) Prior Publication Data

US 2013/0119953 A1 May 16, 2013

Related U.S. Application Data

(63) Continuation of application No. PCT/JP2011/057098, filed on Mar. 24, 2011.

(30) Foreign Application Priority Data

Sep. 28, 2010 (JP) ................................. 2010-217249

(51) Int. Cl.
 *G05F 1/575* (2006.01)
 *G05F 1/618* (2006.01)
(52) U.S. Cl.
 USPC ............................ 323/285; 323/284; 323/288
(58) Field of Classification Search
 USPC ................. 323/225, 271, 282, 284, 285, 288, 323/351
 See application file for complete search history.

(56) References Cited

U.S. PATENT DOCUMENTS

| 6,151,233 | A | 11/2000 | Kondo | |
|---|---|---|---|---|
| 7,372,241 | B1* | 5/2008 | Tomiyoshi | 323/288 |
| 7,936,160 | B1* | 5/2011 | Sheehan | 323/285 |
| 2008/0049473 | A1 | 2/2008 | Sugahara et al. | |
| 2009/0079410 | A1 | 3/2009 | Ohkawa et al. | |
| 2009/0108824 | A1* | 4/2009 | Chen | 323/285 |
| 2009/0237053 | A1* | 9/2009 | Gan | 323/283 |

(Continued)

FOREIGN PATENT DOCUMENTS

| JP | 11-235022 A | 8/1999 |
|---|---|---|
| JP | 2008-35641 A | 2/2008 |
| WO | 2006/123738 A1 | 11/2006 |

OTHER PUBLICATIONS

Official Communication issued in International Patent Application No. PCT/JP2011/057098, mailed on May 10, 2011.

*Primary Examiner* — Gary L Laxton
(74) *Attorney, Agent, or Firm* — Keating & Bennett, LLP

(57) ABSTRACT

A DC-DC converter operates as a step-down chopper using a main switch element, a sub switch element, an inductor and a capacitor. A sub switch control signal generating circuit discharges a capacitor with a voltage that is proportional to a difference between a voltage of a power supply input unit and a voltage of a power supply output unit when a PGATE signal is at an "L" level, and charges the capacitor with a voltage that is proportional to the voltage of the power supply output unit when an NGATE signal is at an "H" level. The sub switch element is forcibly turned off and reverse flow of an inductor current is prevented even at the time of a light load as a result of the voltage of the capacitor being generated as an NCTL signal. Thus, reverse flow of an inductor current is prevented and a high-efficiency DC-DC converter is provided without the use of a high-speed comparator or any other kind of comparator.

20 Claims, 12 Drawing Sheets

U.S. PATENT DOCUMENTS

2009/0295350 A1* 12/2009 Yamada .................. 323/282
2010/0270995 A1* 10/2010 Laur et al. ................ 323/285
2010/0283442 A1* 11/2010 Nakashima .............. 323/283
2012/0019226 A1* 1/2012 Wiktor .................... 323/285

* cited by examiner

DC-DC CONVERTER

BACKGROUND OF THE INVENTION

1. Field of the Invention

The present invention relates to DC-DC converters which include a main switch element and a sub switch element and an inductor, and convert an input DC voltage into a desired DC voltage and then output the desired DC voltage by alternately turning the main switch element and the sub switch element on and off.

2. Description of the Related Art

A step-down chopper circuit DC-DC converter such as that described in Japanese Unexamined Patent Application Publication No. 11-235022 is a known example of a power supply circuit that is provided inside of, for example, a mobile electronic appliance. Such a step-down chopper circuit DC-DC converter includes a circuit for preventing a reverse current from flowing to ground via an inductor from a capacitor when there is a light load (hereafter, referred to as "reverse flow of inductor current").

FIG. 1 is a circuit diagram of a DC-DC converter 3 described in Japanese Unexamined Patent Application Publication No. 11-235022. This DC-DC converter 3 includes a first switch 11, a second switch 15, an inductor 12, a capacitor 13 and a diode 14.

In FIG. 1, a voltage integration control circuit 23 includes a voltage-current conversion circuit 31 that detects an input voltage Vi and an output voltage Vo and converts the voltages Vi and Vo, with or without subjecting them to adjustment processing, into a current, whereby a current is generated in accordance with an amount of change dIL/dt of an induced current IL, a current-voltage conversion capacitor 32 that stores an output current of the voltage-current conversion circuit 31 and converts the current into a voltage, a comparator 33 that compares an output voltage Vc of the current-voltage conversion capacitor 32 with a reference voltage Vref1 having a predetermined value, and a power supply 34 that generates the reference voltage Vref1 and inputs the reference voltage Vref1 to the comparator 33.

The voltage-current conversion circuit 31 generates a current that is proportional to Vi−Vo on the basis of the input voltage Vi and the output voltage Vo when the first switch 11 is in a conductive state and causes the current to flow into the current-voltage conversion capacitor 32. On the other hand, when the first switch 11 is in a disconnected state, the voltage-current conversion circuit 31 extracts a current that is proportional to the output voltage Vo from the current-voltage conversion capacitor 32.

Thus, the voltage Vc across the two ends of the current-voltage conversion capacitor 32 changes in proportion to a forward direction current flowing through the inductor 12. Therefore, the point in time at which a reverse current begins to flow through the inductor 12 can be detected as a point in time at which the voltage Vc becomes 0 V. As a result, the comparator 33 compares the voltage Vc and the reference voltage Vref1 and so long as the comparator 33 instructs a control circuit 21 to disconnect the second switch 15 before the voltage Vc becomes 0 (V), the second switch 15 can be disconnected before a reverse direction current flows through the inductor 12. With this configuration, it is attempted to prevent reverse flow of an inductor current.

However, the DC-DC converter of the related art illustrated in FIG. 1 has a configuration in which detection of a capacitor potential becoming 0 V is performed by using a comparator, and therefore the frequency is high and a transmission delay time of the comparator cannot be ignored. That is, the output of the comparator has a response delay equal to a transmission delay time, and therefore reverse flow of a current and loss occur due to such a delay when there is a light load. If a comparator having a shorter transmission delay time is used, the period of time during which reverse flow of a current occurs is shortened, but a high-speed comparator having a short transmission delay time typically consumes a very large amount of power and therefore the efficiency of the DC-DC converter as a whole is reduced. In addition, as illustrated in FIG. 1, although a delay compensation method that uses an offset reference voltage Vref1 is known, the compensation is not perfect because there is a different delay time for each set of operating conditions. In addition, a stable voltage circuit such as a band gap circuit has to be used for Vref1, and there are issues that need to be solved such as a circuit area being needed.

SUMMARY OF THE INVENTION

Accordingly, preferred embodiments of the present invention provide a high-efficiency DC-DC converter by preventing reverse flow of an inductor current without the use of a comparator.

A DC-DC converter according to a first aspect of a preferred embodiment of the present invention includes a series circuit including a main switch element and a sub switch element and connected in series with a power supply input unit to which a direct current voltage is input, and a smoothing circuit including an inductor and a capacitor and provided between a connection point between the main switch element and the sub switch element, and a power supply output unit.

The DC-DC converter further includes a drive circuit that outputs a drive signal to the main switch element and the sub switch element, a pulse generating circuit that outputs a pulse signal to the drive circuit, and a sub switch control signal generating circuit that generates a sub switch control signal to prevent reverse flow of a current through the inductor at the time of a light load.

The sub switch control signal generating circuit includes a detection capacitor, a charging/discharging circuit that charges/discharges the detection capacitor in accordance with switching periods of the main switch element and the sub switch element, and a sub switch control signal output circuit that outputs the sub switch control signal on the basis of a potential of the detection capacitor.

With this configuration, a capacitor potential is used as the input of a subsequent logic circuit as is without the use of a comparator, and therefore power consumption due to the use of a high-speed comparator having a short delay time can be prevented and a comparator, which was required in the related art, is not necessary, and as a result the power efficiency can be improved.

According to a second aspect of a preferred embodiment of the present invention, the DC-DC converter further includes a level shifting circuit that is input with a potential of the capacitor and that outputs a level-shifted voltage signal. With this configuration, the capacitance of the capacitor and the value of a current of the current supply used in charging and discharging can be reduced and a reduction in circuit size and a reduction in power consumption can be achieved.

According to a third aspect of a preferred embodiment of the present invention, the DC-DC converter further includes a logic circuit that converts a capacitor voltage signal into a logic level signal and outputs the logic level signal as the sub switch control signal. With this configuration, control can be more stably performed as a result of the sub switch control signal, which is to be supplied to the pulse generating circuit, being supplied as a logic level signal.

According to a fourth aspect of a preferred embodiment of the present invention, in the DC-DC converter, the smoothing circuit including the inductor and the capacitor is connected between a connection point between the main switch element and the sub switch element, and the power supply output unit, (that is, the DC-DC converter preferably is a step-down DC-DC converter).

The DC-DC converter further includes a first current supply that generates a current that is substantially proportional to Vi and a second current supply that generates a current that is substantially proportional to Vo, where a voltage input to the power supply input unit is denoted by Vi and a voltage output from the power supply output unit is denoted by Vo.

The first current supply and the second current supply are connected such that a potential of the capacitor changes in a first direction with a difference in current between the first current supply and the second current supply in an on period of the main switch element and a potential of the capacitor changes in a second direction with the second current supply in an on period of the sub switch element.

According to a fifth aspect of a preferred embodiment of the present invention, in the DC-DC converter, a voltage-current conversion rate of the second current supply is substantially equal to or smaller than a voltage-current conversion rate of the first current supply.

With this configuration, a phenomenon in which a current flows through a body diode of the sub switch element at the time of a normal load or a heavy load due to an error factor can be prevented.

According to a sixth aspect of a preferred embodiment of the present invention, in the DC-DC converter, the inductor is connected between a connection point between the main switch element and the sub switch element, and the power supply input unit, (that is, the DC-DC converter is a step-up DC-DC converter).

The DC-DC converter further includes a first current supply that generates a current that is substantially proportional to Vi and a second current supply that generates a current that is substantially proportional to Vo, where a voltage input to the power supply input unit is denoted by Vi and a voltage output from the power supply output unit is denoted by Vo.

The first current supply and the second current supply are connected such that a potential of the capacitor changes in a first direction with the first current supply in an on period of the main switch element and a potential of the capacitor changes in a second direction with a difference in current between the first current supply and the second current supply in an on period of the sub switch element.

According to a seventh aspect of a preferred embodiment of the present invention, in the DC-DC converter, a voltage-current conversion rate of the second current supply is substantially equal to or smaller than a voltage-current conversion rate of the first current supply.

With this configuration, a phenomenon in which a current flows through a body diode of the sub switch element at the time of a normal load or a heavy load due to an error factor can be prevented.

According to various preferred embodiments of the present invention, a capacitor potential is used as the input of a subsequent logic circuit as is without the use of a comparator, and therefore power consumption due to the use of a high-speed comparator with a short delay time can be prevented and the power consumption of a comparator, which was required in the related art, is not necessary, and the power efficiency can be improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A DC-DC converter of a first preferred embodiment of the present invention will be described with reference to the drawings.

Figure 1:
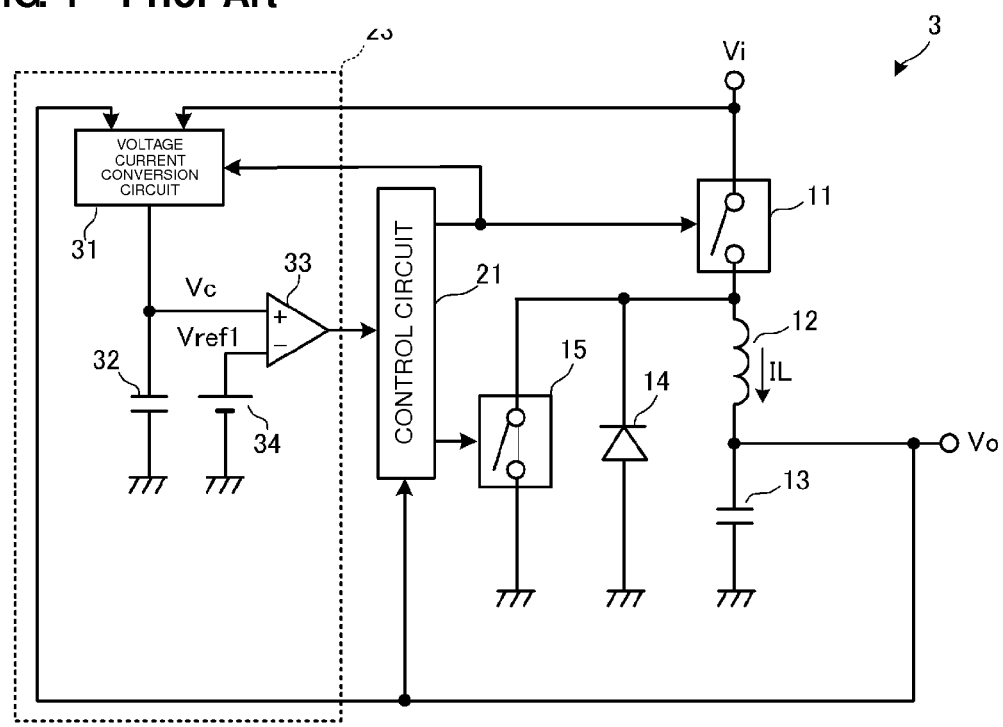
FIG. 1 is a circuit diagram of a DC-DC converter 3 described in Japanese Unexamined Patent Application Publication No. 11-235022.
Figure 2:
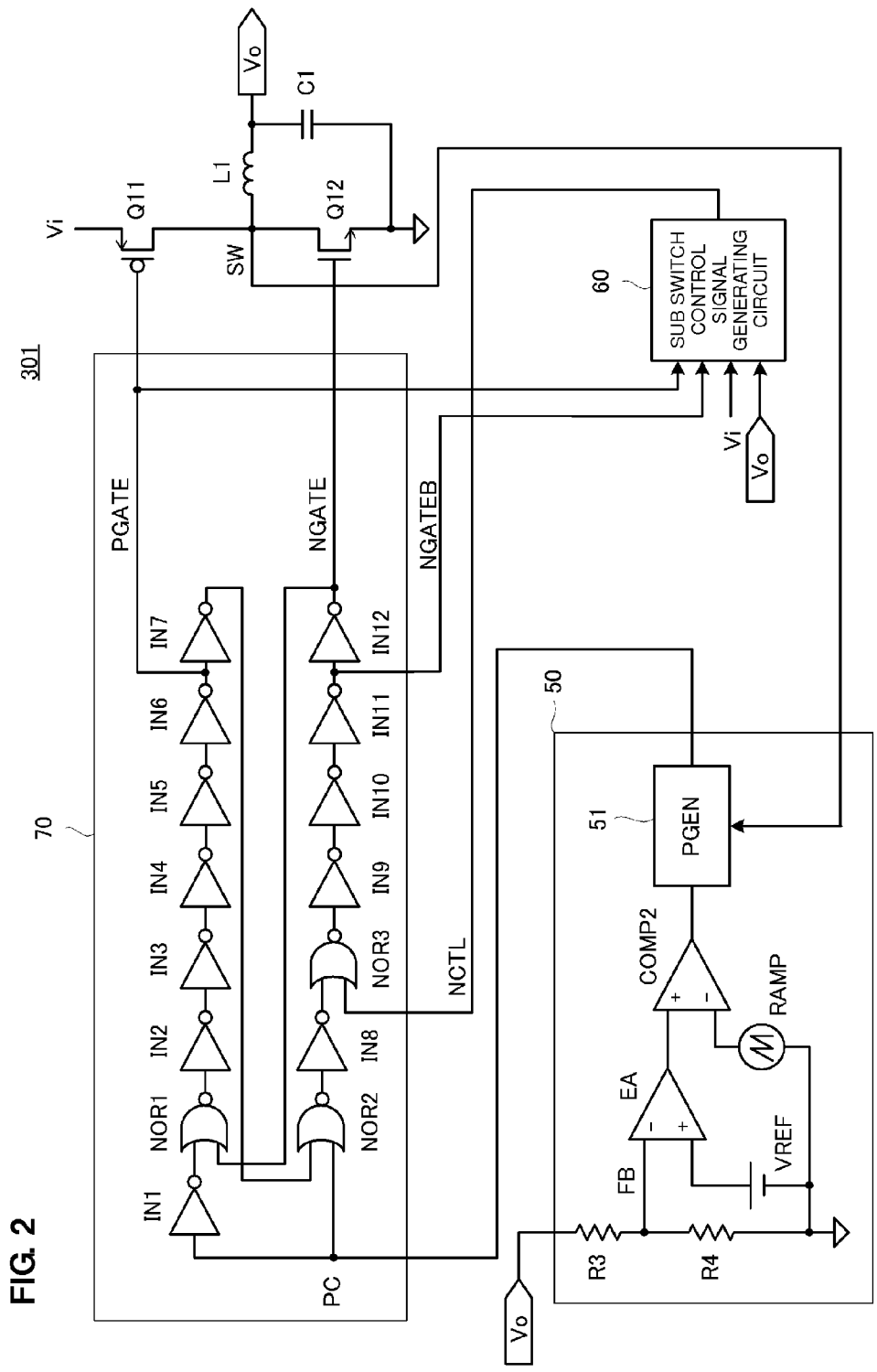
FIG. 2 is a circuit diagram of the entirety of a DC-DC converter 301 of a first preferred embodiment of the present invention.

FIG. 2 is a circuit diagram of the entirety of a DC-DC converter 301 of the first preferred embodiment of the present invention. This DC-DC converter 301 includes a series circuit including a main switch element Q11 and a sub switch element Q12 and connected in series with a power supply input unit Vi to which a predetermined direct current voltage is input, and a smoothing circuit including an inductor L1 and a capacitor C1 and provided between a connection point between the main switch element Q11 and the sub switch element Q12, and a power supply output unit Vo. The DC-DC converter is a step-down chopper type DC-DC converter that supplies power at a fixed direct current voltage to a load from the power supply output unit Vo.

In FIG. 2, a pulse generating circuit 50 includes resistors R3 and R4, an error amplifier EA, a reference voltage generating circuit VREF, a ramp waveform signal generating circuit RAMP, a comparator COMP2 and a PWM/PFM signal generating circuit 51. The error amplifier EA amplifies an error voltage between a voltage produced by the output voltage of the power supply output unit Vo being divided between the resistors R3 and R4 and a reference voltage VREF generated by the reference voltage generating circuit VREF. The comparator COMP2 compares an output voltage of the error amplifier EA and a ramp waveform signal generated by the ramp waveform signal generating signal circuit RAMP and outputs a PWM control signal. The PWM/PFM signal generating circuit 51 outputs a PC signal to a drive circuit 70. By utilizing this PC signal, PWM control is performed when there is a heavy load and PFM control is performed when there is a light load.

A PGATE signal provided to a gate of the main switch element Q11, an NGATEB signal, which is a signal that is the inverse of an NGATE signal provided to a gate of the sub switch element Q12, a voltage (Vi) of the power supply input unit Vi, and a voltage (Vo) of the power supply output unit Vo are input to a sub switch control signal generating circuit 60 and a sub switch control signal NCTL is output from the sub switch control signal generating circuit 60.

The drive circuit 70 includes inverters (NOT gates) IN1 to IN6, a NOR gate NOR1, inverters IN7 to IN12, and NOR gates NOR2 and NOR3.

The inverters (NOT gates) IN1 to IN6 and the NOR gate NOR1 are connected to the gate of the main switch element Q11. The main switch element Q11 is controlled using the PGATE signal generated from the PC signal and the NGATE signal via these logic circuits.

In addition, the inverters IN7 to IN12 and the NOR gates NOR2 and NOR3 are connected to the gate of the sub switch element Q12. The sub switch element Q12 is controlled using the NGATE signal generated from the PC signal, an inverse PGATE signal and an NCTL signal via these logic circuits.

The main switch element Q11 preferably is a P channel MOS-FET and therefore is turned on when the PGATE signal is at a low level. The sub switch element Q12 preferably is an N channel MOS-FET and therefore is turned on when the NGATE signal is at a high level.

In an on period of the main switch element Q11 (at this time, the sub switch element Q12 is off), a current flows through the inductor L1 from the power supply input unit Vi in a direction toward the power supply output unit Vo. After that, when the main switch element Q11 is turned off and the sub switch element Q12 is turned on, the current of the inductor L1 flows through the sub switch element Q12.

Figure 3:
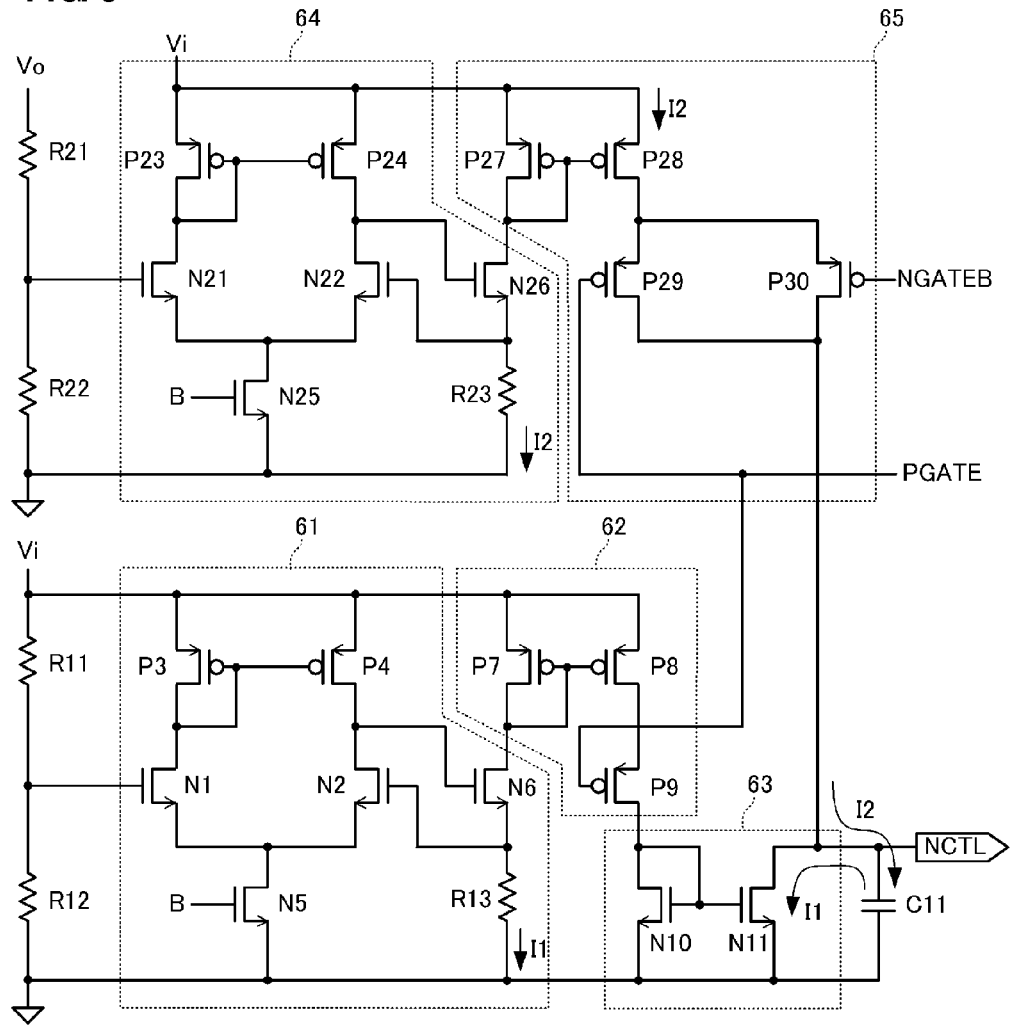
FIG. 3 is a circuit diagram of a sub switch control signal generating circuit 60.

FIG. 3 is a circuit diagram of the sub switch control signal generating circuit 60.

As illustrated in FIG. 3, the sub switch control signal generating circuit 60 includes a voltage dividing circuit including resistors R11 and R12, a voltage dividing circuit including resistors R21 and R22, voltage-current conversion circuits 61 and 64, current mirror circuits 62, 63 and 65 and a capacitor C11.

The voltage-current conversion circuit 61 includes P-channel MOS-FETs P3 and P4, N-channel MOS-FETs N1, N2, N5 and N6 and a resistor R13 and a divided output voltage of the resistors R11 and R12 is non-invertedly input thereto and a voltage dropped across the resistor R13 is invertedly input thereto.

The current mirror circuit 62 includes P-channel MOS-FETs P7, P8 and P9.

The voltage dropped across the resistor R13 is negatively fed back and an output of the voltage-current conversion circuit 61 is output to the gate of N6 and therefore as a result the voltage dropped across the resistor R13 and the divided voltage of the resistors R11 and R12 become equal to each other. Consequently, a current I1, which is proportional to the voltage Vi of the power supply input unit Vi flows through the left-hand side of the current mirror circuit 62. If the current ratio of the current mirror circuit 62 is made to be 1:1, when the MOS-FET P9 is on, the current I1 flows through the right-hand side of the current mirror circuit 62.

The current mirror circuit 63 includes N-channel MOS-FETs N10 and N11. If the current ratio of the current mirror circuit 63 is made to be 1:1, the current I1 flows through the MOS-FET N11.

The voltage-current conversion circuit 64 includes P-channel MOS-FETs P23 and P24, N-channel MOS-FETs N21, N22, N25 and N26 and a resistor R23, and the divided output voltage of the resistors R21 and R22 is non-invertedly input thereinto and a voltage dropped across the resistor R23 is invertedly input thereinto.

The current mirror circuit 65 includes P-channel MOS-FETs P27, P28, P29 and P30.

A voltage dropped across the resistor R23 is negatively fed back and an output of the voltage-current conversion circuit 64 is output to the gate of N26 and therefore as a result the voltage dropped across R23 and the divided voltage of the resistors R21 and R22 become equal to each other. Consequently, a current I2, which is proportional to the voltage Vo of the power supply output unit Vo, flows through the left-hand side of the current mirror circuit 65. If the current ratio of the current mirror circuit 65 is made to be 1:1, when the MOS-FET P29 or P30 is on, the current I2 flows through the right-hand side of the current mirror circuit 65.

The voltage of the capacitor C11 is output as the NCTL signal. If the threshold of an input that causes the output of the NOR gate NOR3 illustrated in FIG. 2 to undergo a state transition from an L level to a H level is made to be VtL, when the voltage of the NCTL signal exceeds the threshold VtL, the NGATE signal changes to an L level and the sub switch element Q12 is forcibly turned off.

The relationship between the PGATE signal and the NGATEB signal, the states of the MOS-FETs P9, P29 and P30 and the states of the main switch element Q11 and the sub switch element Q12 illustrated in FIG. 2 and the current flowing through the capacitor C11 of the sub switch control signal generating circuit 60 illustrated in FIG. 3 is as follows.

TABLE 1

| PGATE | NGATEB | Q11 | Q12 | P9 | P29 | P30 | C11 Current |
|-------|--------|-----|-----|-----|-----|-----|-------------|
| L     | H      | on  | off | on  | on  | off | I2-I1       |
| H     | L      | off | on  | off | off | on  | I2          |

Therefore, in an on period of the main switch element Q11, the capacitor C11 is discharged with a current (I1−I2), and in an on period of the sub switch element Q12, the capacitor C11 is charged with a current I2.

Figure 4A:
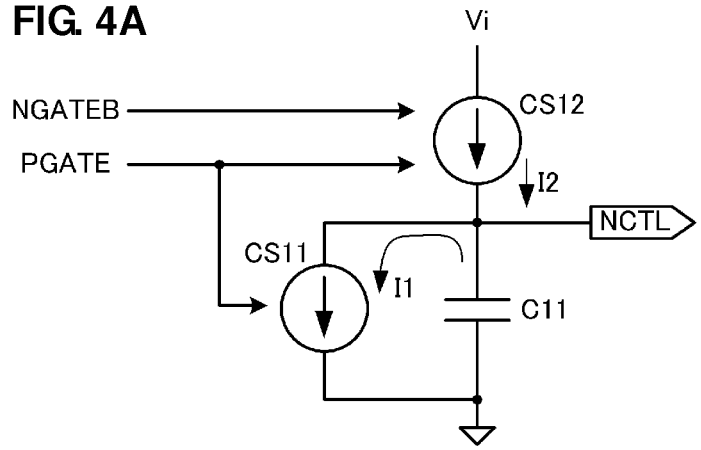
FIG. 4A illustrates in a simplified manner a circuit that charges and discharges a capacitor C11 illustrated in FIG. 3.

FIG. 4A illustrates in a simplified manner a circuit that charges and discharges the capacitor C11 illustrated in FIG. 3. In FIG. 4A, a first current supply CS11 is a circuit including the voltage-current conversion circuit 61 and the current mirror circuits 62 and 63 illustrated in FIG. 3 and is turned on when the PGATE signal is at an L level. In addition, a second current supply CS12 is a circuit including the voltage-current conversion circuit 64 and the current mirror circuit 65 illustrated in FIG. 3 and is turned on when the PGATE signal or the NGATEB signal is at an L level.

Here, if the voltage-current conversion rate of the first current supply CS11 is denoted by a and the voltage-current conversion rate of the second current supply CS12 is denoted by b, the relationships I1=aVi and I2=bVo are satisfied. Therefore, the potential of the capacitor C11 decreases with a slope corresponding to bVo−aVi (<0) in the on period of the main switch element Q11, and the potential of the capacitor C11 increases with a slope corresponding to bVo in the on period of the sub element Q12.

Figure 4B:
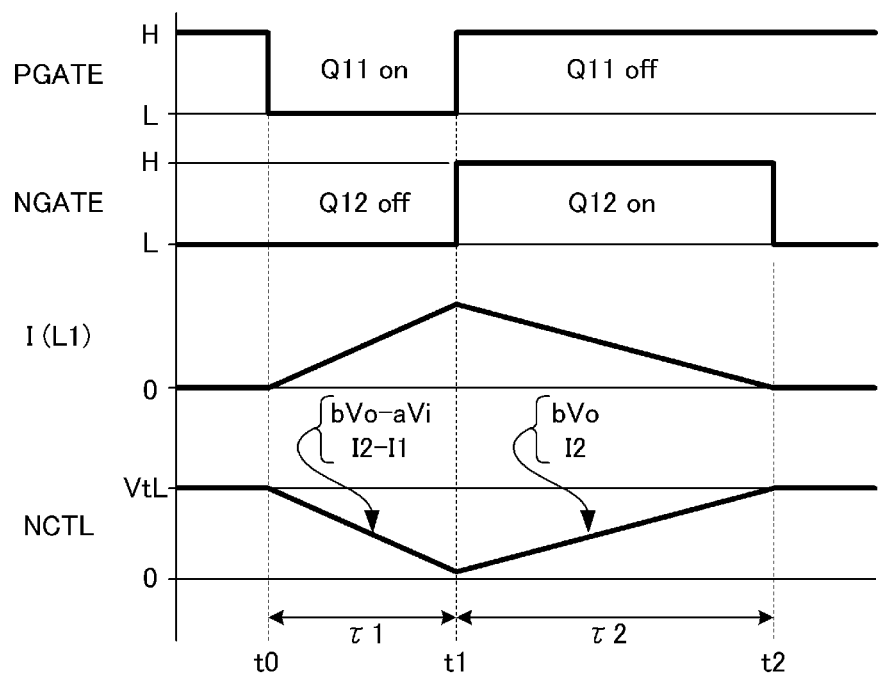
FIG. 4B is a waveform diagram of a PGATE signal, an NGATE signal, a current I(L1) flowing through an inductor L1 and an NCTL signal.

FIG. 4B is a waveform diagram of a PGATE signal, an NGATE signal, a current I(L1) flowing through the inductor L1 and an NCTL signal.

At time t0, when the PGATE signal changes to the L level, the main switch element Q11 is turned on. In a time period τ1, in which the PGATE signal is at the L level, a current flowing through the inductor L1 increases. Assuming that the initial value of the charging voltage of the capacitor C11 illustrated in FIG. 3 and FIG. 4A is VtL, in the on period τ1 of the main switch element Q11, the voltage of the capacitor C11 continuously decreases from VtL.

After that, at time t1, when the PGATE signal changes to the H level and the NGATE signal changes to the H level (NGATEB signal changes to the L level), the main switch element Q11 is turned off and the sub switch element Q12 is turned on. In a period τ2 in which the NGATE signal is at the H level (NGATEB signal is at the L level), a current I(L1) flowing through the inductor L1 decreases. In addition, the charging voltage of the capacitor C11 continuously increases from the voltage that existed at time t1.

At time t2, when the voltage of the capacitor C11 exceeds VtL, the NCTL signal substantially changes to the H level and the sub switch element Q12 is forcibly turned off. That is, as has already been described, since the threshold for a state transition from an L level to a H level for an input signal of the NOR gate NOR3 illustrated in FIG. 2 is VtL, when the voltage of the NCTL signal reaches VtL, the NGATE signal changes to the L level and therefore the sub switch element Q12 is forcibly turned off. In the period τ1, the inductor current increases in proportion to Vi−Vo, and in the period τ2, the inductor current decreases in proportion to −Vo (<0). If a=b, the time when the inductor current becomes 0 and the time when NCTL reaches VtL coincide with each other. Therefore, reverse flow is prevented.

Figure 5:
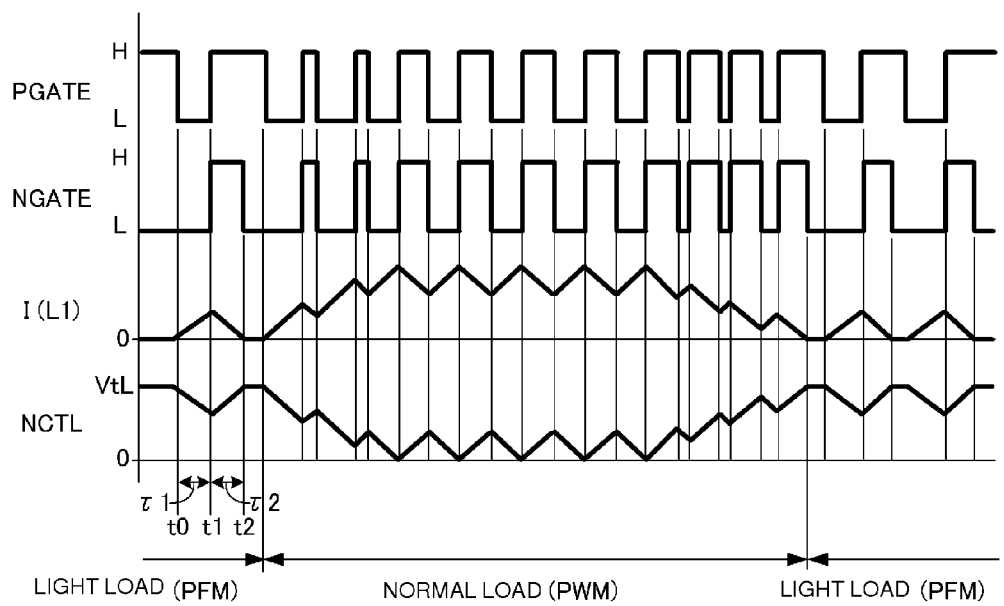
FIG. 5 is a waveform diagram of the PGATE signal, the NGATE signal, the inductor L1 current I(L1) and the NCTL signal when the load changes.

There is a relationship of a b between the voltage-current conversion rate a of the first current supply CS11 and the voltage-current conversion rate b of the second current supply CS12. If a=b, as illustrated in FIG. 4B, the NCTL signal reaches VtL at t2. In addition, as illustrated in FIG. 5, when operation moves to a heavier load side, NCTL moves to the low potential side and the sub switch control signal generating circuit 60 stops functioning. Thus, prevention of reverse flow only functions at times of a light load and, PWM operates with a minimum deadtime at times of a normal or heavy load. However, if, due to some error factor, a<b the switching timing of Q12 due to NCTL becomes faster and regardless of whether there is a normal load or a heavy load the capacitor C11 is slowly charged and control to forcibly turn off the sub switch element Q12 is performed. Consequently, since the synchronous rectification period is decreased and the period in which a current flows though a body diode of the sub switch element is increased, efficiency is decreased and control becomes unstable. Consequently, it is desirable that the voltage-current conversion rate b of the second current supply be made slightly smaller than the voltage-current conversion rate a of the first current supply in advance. Thus, since the potential of the capacitor C11 changes in a direction in which turn off timing of the sub switch element is delayed, the function of the sub switch control signal generating circuit 60 becomes ineffective with certainty at times of normal load and heavy load due to an error factor. Strictly speaking, if a>b, reverse flow will occur when there is a light load, but the loss due to the reverse flow will be negligible since the difference from a=b will be very small.

The setting of a balanced relationship between these voltage-current conversion rates is similar to as that in another preferred embodiment described below.

FIG. 5 is a waveform diagram of a PGATE signal, an NGATE signal, an inductor L1 current I(L1) and an NCTL signal at a time when the load is changing.

The times t1, t2 and t3 and the time periods τ1 and τ2 in FIG. 5 respectively correspond to the times t1, t2 and t3 and the time periods τ1 and τ2 in FIG. 4B. With a light load, the main switch element Q11 and the sub switch element Q12 both operate in a current discontinuous mode in which they are both turned off. Stabilization of the output voltage under a light load is performed by the above-described PFM control. When the load becomes a normal load, the main switch element Q11 and the sub switch element Q12 are alternately turned on and off and operate in a current continuous mode in which the inductor current I(L1) continuously flows. Stabilization of the output voltage under a normal load is performed by the above-described PWM control.

Second Preferred Embodiment

Figure 6A:
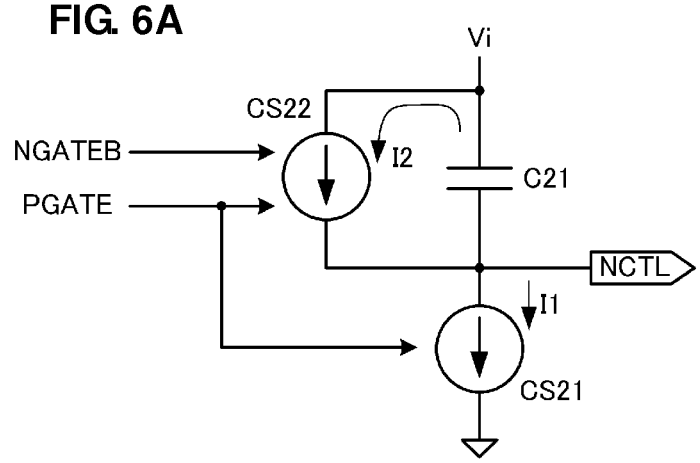
FIG. 6A illustrates in a simplified manner a circuit that charges and discharges a capacitor C21 of a sub switch control signal generating circuit of a DC-DC converter of a second preferred embodiment of the present invention.

FIG. 6A illustrates in a simplified manner a circuit that charges and discharges a capacitor C21 of a sub switch control signal generating circuit of a DC-DC converter of a second preferred embodiment. The structure of the entirety of the DC-DC converter is the same as that illustrated in FIG. 2. Therefore, description of the operation of the individual components of the DC-DC converter will be made using the symbols given in FIG. 2.

In the first preferred embodiment, as illustrated in FIG. 4, a structure was adopted in which the capacitor C11 is provided on the ground potential side and a voltage of the capacitor C11 is output as an NCTL signal. In the second preferred embodiment, the capacitor C21 is provided on the power supply potential side and a voltage that is lower than the power supply voltage Vi by the voltage dropped across the capacitor C21 is output as the NCTL signal.

In FIG. 6A, a first current supply CS21 is turned on when the PGATE signal is at an L level. In addition, a second current supply CS22 is turned on when the PGATE signal or the NGATEB signal is at an L level. Here, if the voltage-current conversion rate of the first current supply CS21 is denoted by a and the voltage-current conversion rate of the second current supply CS22 is denoted by b, the relationships I1=aVi and I2=bVo are satisfied. Therefore, the capacitor C21 is charged with a slope that corresponds to aVi−bVo in an on period of the main switch element Q11 and is discharged with a slope that is proportional to bVo in an on period of the sub switch element Q12.

Figure 6B:
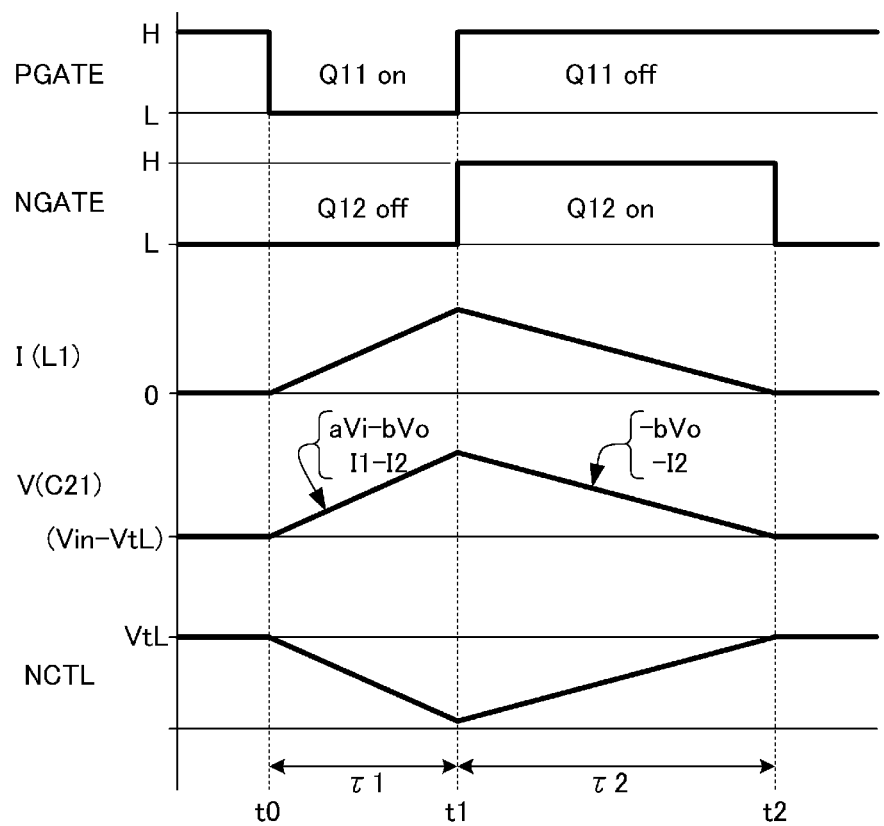
FIG. 6B is a waveform diagram of a PGATE signal, an NGATE signal, a voltage V(C21) of the capacitor C21 and an NCTL signal.

FIG. 6B is a waveform diagram of a PGATE signal, an NGATE signal, a voltage V(C21) of the capacitor C21 and an NCTL signal.

At time t0, when the PGATE signal changes to the L level, the main switch element Q11 (refer to FIG. 2) is turned on. In a time period τ1, in which the PGATE signal is at the L level, a current flowing through the inductor L1 (refer to FIG. 2) increases. Assuming that the initial value of the charging voltage of the capacitor C21 illustrated in FIG. 6A is (Vi−VtL), the voltage of the capacitor C11 in the period τ1, in which the PGATE signal is at the L level, increases with a slope that is proportional to aVi−bVo from (Vi−VtL).

After that, at time t1, when the PGATE signal changes to the H level and the NGATE signal changes to the H level (NGATEB signal changes to the L level), the main switch element Q11 is turned off and the sub switch element Q12 (refer to FIG. 2) is turned on. In a period τ2 in which the NGATE signal is at the H level (NGATEB signal is at the L level), a current flowing through the inductor L1 decreases. In addition, the capacitor C21 is discharged with a slope that is proportional to bVo.

The NCTL signal is a voltage that is produced by the voltage V(C21) of the capacitor C21 being subtracted from the voltage Vi of the power supply input unit Vi and therefore has a waveform in which the amplification direction is the inverse of that of V(C21) as illustrated in FIG. 8.

At time t2, when the voltage of the capacitor C21 has decreased to (Vi−VtL), the NCTL signal substantially changes to the H level and the sub switch element Q12 is forcibly turned off. That is, as has already been described, since the threshold for a state transition from an L level to a H level for an input signal of the NOR gate NOR3 illustrated in FIG. 2 is VtL, when the voltage of the NCTL signal exceeds VtL, the NGATE signal changes to the L level and the sub switch element Q12 is forcibly turned off. Thus, reverse flow of the inductor current is prevented.

Third Preferred Embodiment

Figure 7A:
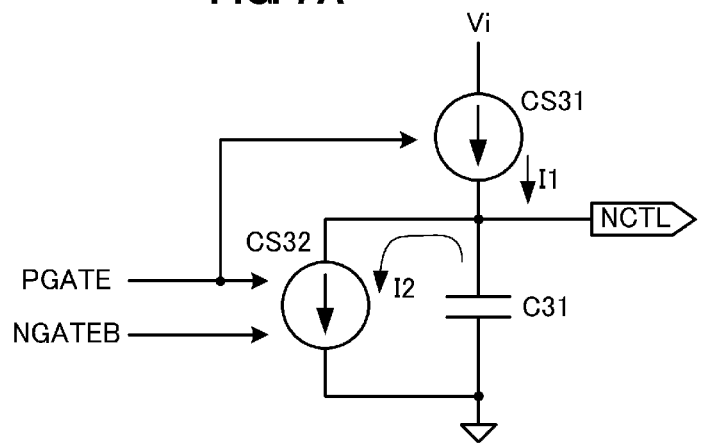
FIG. 7A illustrates in a simplified manner a circuit that charges and discharges a capacitor C21 of a sub switch control signal generating circuit of a DC-DC converter of a third preferred embodiment of the present invention.

FIG. 7A illustrates in a simplified manner a circuit that charges and discharges a capacitor C31 of a sub switch control signal generating circuit of a DC-DC converter of a third preferred embodiment of the present invention. The structure of the entirety of the DC-DC converter is the same as that illustrated in FIG. 2 and therefore description of the operation of the individual components of the DC-DC converter will be made using the symbols given in FIG. 2. However, in the third preferred embodiment, in the drive circuit 70, the NGATE signal changes to the L level when the NCTL signal changes to an H level. This can be realized by for example inserting an inverter into the NCTL signal input unit, which is the NOR gate NOR3.

In FIG. 7A, a first current supply CS31 is turned on when the PGATE signal is at an L level. In addition, a second current supply CS32 is turned on when the PGATE signal or the NGATEB signal is at an L level. Here, if the voltage-current conversion rate of the first current supply CS31 is denoted by a and the voltage-current conversion rate of the second current supply CS32 is denoted by b, the relationships I1=aVi and I2=bVo are satisfied. Therefore, the capacitor C31 is charged with a slope that corresponds to aVi−bVo in an on period of the main switch element Q11 and is discharged with a slope that is proportional to bVo in an on period of the sub switch element Q12.

Figure 7B:
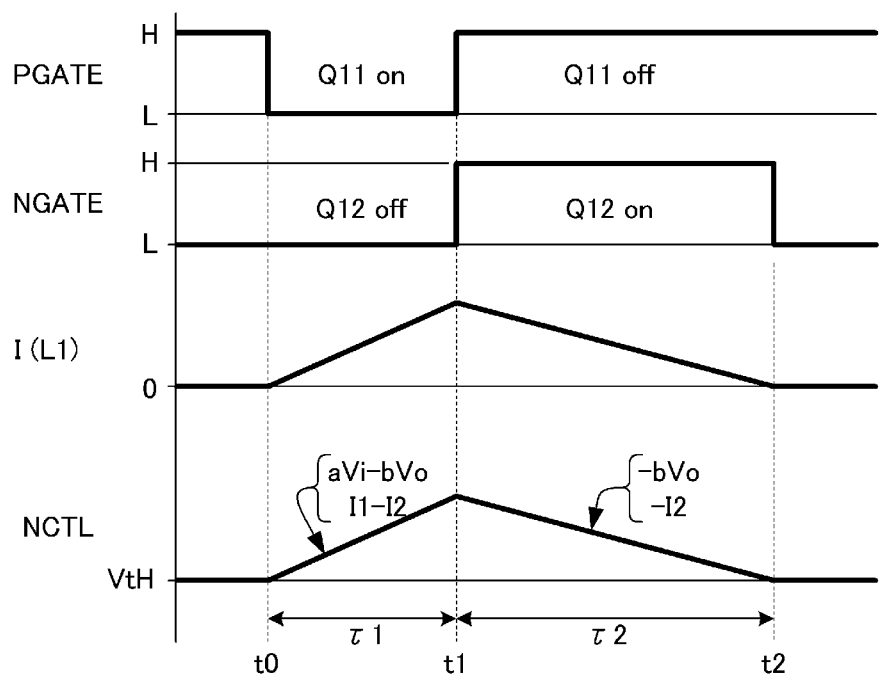
FIG. 7B is a waveform diagram of a PGATE signal, an NGATE signal, a voltage V(C31) of a capacitor C31 and an NCTL signal.

FIG. 7B is a waveform diagram of a PGATE signal, an NGATE signal and an NCTL signal. At time t0, when the PGATE signal changes to the L level, the main switch element Q11 (refer to FIG. 2) is turned on. In a time period τ1, in which the PGATE signal is at the L level, a current flowing through the inductor L1 (refer to FIG. 2) increases. In addition, the voltage of the capacitor C31 increases with a slope that is proportional to aVi−bVo.

After that, at time t1, when the PGATE signal changes to the H level and the NGATE signal changes to the H level (NGATEB signal changes to the L level), the main switch element Q11 is turned off and the sub switch element Q12 (refer to FIG. 2) is turned on. In a period τ2 in which the NGATE signal is at the H level (NGATEB signal is at the L level), a current flowing through the inductor L1 decreases. In addition, the capacitor C31 is discharged with a slope that is proportional to bVo.

At time t2, when the voltage of the capacitor C31 has decreased to VtH, the NCTL signal substantially changes to the L level and the sub switch element Q12 is forcibly turned off. Thus, reverse flow of the inductor current is prevented.

Fourth Preferred Embodiment

Figure 8A:
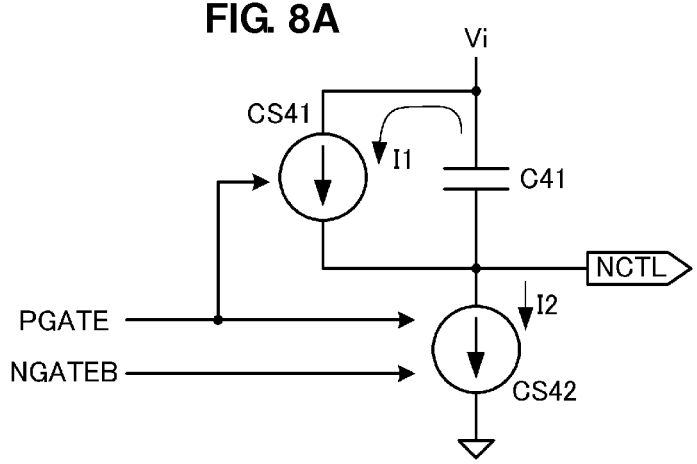
FIG. 8A illustrates in a simplified manner a circuit that charges and discharges a capacitor C41 of a sub switch control signal generating circuit of a DC-DC converter of a fourth preferred embodiment of the present invention.

FIG. 8A illustrates in a simplified manner a circuit that charges and discharges a capacitor C41 of a sub switch control signal generating circuit of a DC-DC converter of a fourth preferred embodiment of the present invention. The structure of the entirety of the DC-DC converter preferably is the same as that illustrated in FIG. 2 and therefore description of the operation of the individual components of the DC-DC converter will be made using the symbols given in FIG. 2. However, in the fourth preferred embodiment, in the drive circuit 70, the NGATE signal changes to an L level when the NCTL signal changes to an H level similarly to the third preferred embodiment.

In FIG. 8A, a first current supply CS41 is turned on when the PGATE signal is at an L level. In addition, a second current supply CS42 is turned on when the PGATE signal or the NGATEB signal is at an L level. Here, the voltage-current conversion rate of the first current supply CS41 is denoted by a and the voltage-current conversion rate of the second current supply CS42 is denoted by b.

Figure 8B:
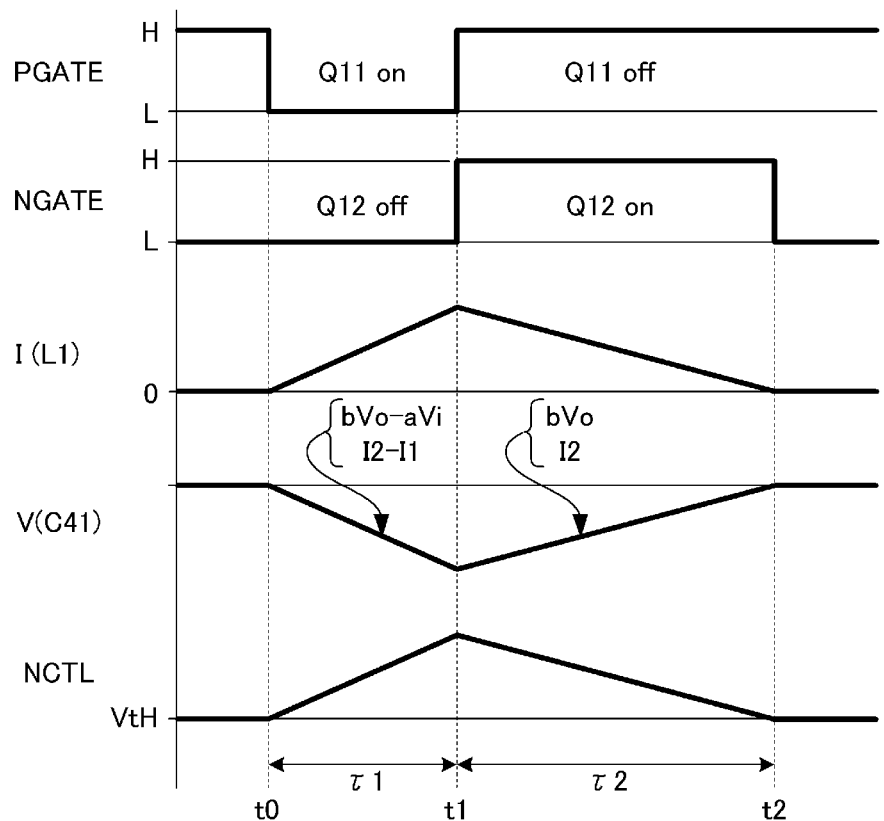
FIG. 8B is a waveform diagram of a PGATE signal, an NGATE signal, a voltage V(C21) of the capacitor C21 and an NCTL signal.

FIG. 8B is a waveform diagram of a PGATE signal, an NGATE signal, a voltage V(C41) of the capacitor C41 and an NCTL signal.

At time t0, when the PGATE signal changes to the L level, the main switch element Q11 (refer to FIG. 2) is turned on. In a time period τ1, in which the PGATE signal is at the L level, a current flowing through the inductor L1 (refer to FIG. 2) increases. In the time period τ1, in which the PGATE signal is at the L level, the capacitor C41 is discharged with a slope that is proportional to bVo−aVi.

After that, at time t1, when the PGATE signal changes to the H level and the NGATE signal changes to the H level (NGATEB signal changes to the L level), the main switch element Q11 is turned off and the sub switch element Q12 (refer to FIG. 2) is turned on. In a period τ2 in which the NGATE signal is at the H level (NGATEB signal is at the L level), a current flowing through the inductor L1 decreases. In addition, the capacitor C41 is charged with a slope that is proportional to bVo.

The NCTL signal is a voltage that is produced by the voltage V(C41) of the capacitor C41 being subtracted from the voltage Vi of the power supply input unit Vi and therefore has a waveform in which the amplification direction is the inverse of that of V(C41), as illustrated in FIG. 8B.

At time t2, the NCTL signal substantially changes to the L level and the sub switch element Q12 is forcibly turned off. Thus, reverse flow of the inductor current is prevented.

Fifth Preferred Embodiment

Figure 9:
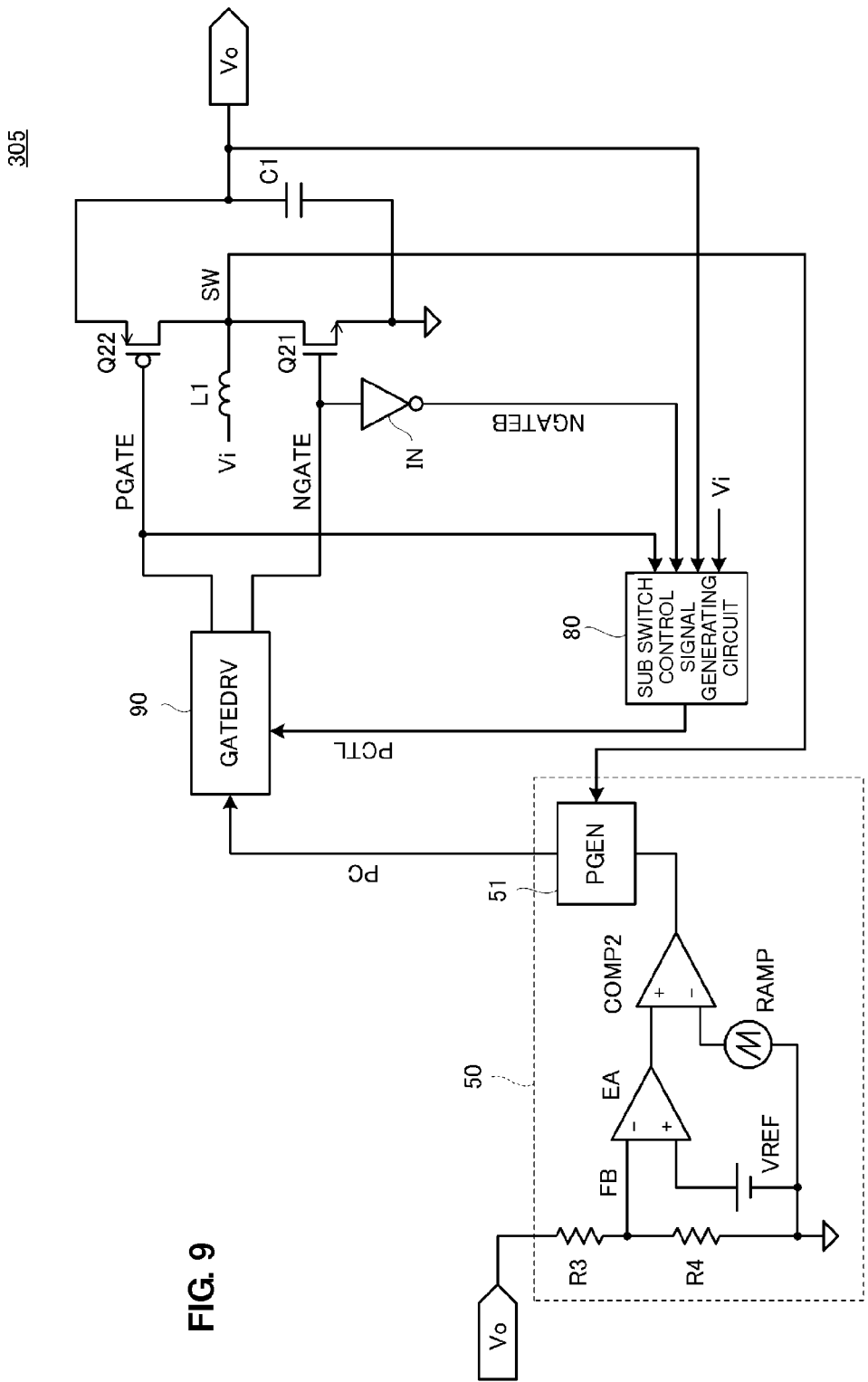
FIG. 9 is a circuit diagram of the entirety of a DC-DC converter of a fifth preferred embodiment of the present invention.

FIG. 9 is a circuit diagram of the entirety of a DC-DC converter of a fifth preferred embodiment of the present invention. A DC-DC converter 305 includes a power supply input unit Vi to which a predetermined direct current voltage is input, a power supply output unit Vo from which a direct current voltage is output, a series circuit including a main switch element Q21 and a sub switch element Q22, an inductor L1 having a first end connected to a connection point between the main switch element Q21 and the sub switch element Q22 and having a second end connected to Vi, and a capacitor C1 provided between the power supply output unit Vo and the ground. The DC-DC converter 305 is a step-up chopper-type DC-DC converter that supplies power at a fixed direct current voltage to a load from the power supply output unit Vo.

The pulse generating circuit 50, as in the example illustrated in FIG. 2, preferably includes the resistors R3 and R4, the error amplifier EA, the reference voltage generating circuit VREF, the ramp waveform signal generating circuit RAMP, the comparator COMP2 and the PWM/PFM signal generating circuit 51.

A sub switch control signal generating circuit 80 is input with a PGATE signal, which is a gate signal of the sub switch element Q22, an NGATEB signal, which is the inverse of an NGATE signal which is a gate signal of the main switch element Q21, and a voltage (Vi) of the power supply input unit Vi, and outputs a sub switch control signal PCTL.

A drive circuit 90 outputs the PGATE signal and the NGATE signal on the basis of a PC signal and the PCTL signal.

The main switch element Q21 preferably is an N-channel MOS-FET and the sub switch element Q22 preferably is a P-channel MOS-FET, which is the inverse of the arrangement in the step-down chopper-type DC-DC converter illustrated in FIG. 2. Therefore, the main switch element Q21 is turned on when the NGATE signal is at a high level and the sub switch element Q22 is turned on when the PGATE signal is at a low level.

In an on period of the main switch element Q21 (at this time, the sub switch element Q22 is off), a current flows through the inductor L1 from the power supply input unit Vi. After that, when the main switch element Q21 is turned off and the sub switch element Q22 is turned on, the current of the inductor L1 flows through the sub switch element Q22 in a direction toward the power supply output unit Vo.

The drive circuit 90 preferably has a similar structure to the drive circuit 70 illustrated in FIG. 2, and when the PCTL signal substantially changes to the L level to cause the subsequent stage to undergo a transition, the PGATE signal is changed to the H level. That is, the sub switch element Q22 is forcibly turned off due to the PCTL signal changing to the L level.

Figure 10:
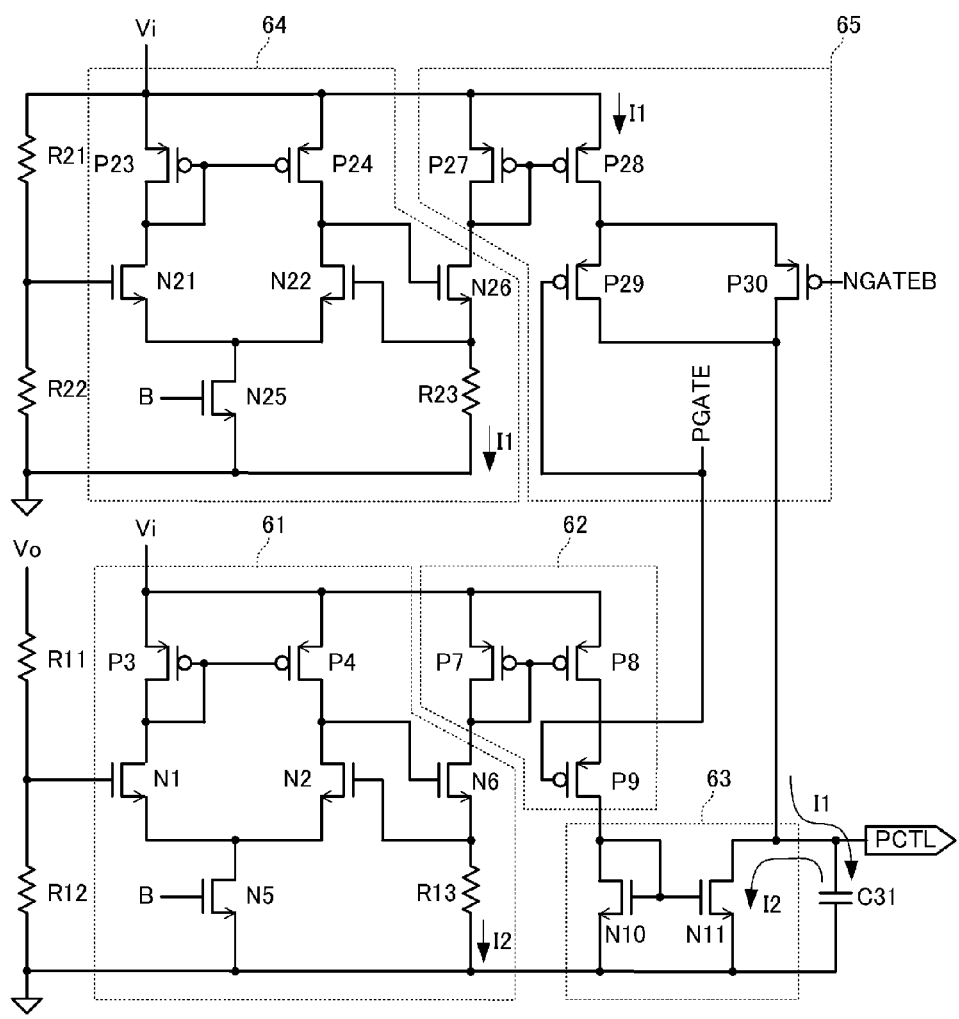
FIG. 10 is a circuit diagram of a sub switch control signal generating circuit 80.

FIG. 10 is a circuit diagram of the sub switch control signal generating circuit 80.

As illustrated in FIG. 10, the sub switch control signal generating circuit 80 includes a voltage dividing circuit including the resistors R11 and R12, a voltage dividing circuit including the resistors R21 and R22, voltage-current conversion circuits 61 and 64, current mirror circuits 62, 63 and 65 and a capacitor C31.

The voltage-current conversion circuit 61 includes the P-channel MOS-FETs P3 and P4, the N-channel MOS-FETs N1, N2, N5 and N6 and the resistor R13 and a divided output voltage of the resistors R11 and R12 is non-invertedly input thereto and a voltage dropped across the resistor R13 is invertedly input thereto.

The current mirror circuit 62 includes the P-channel MOS-FETs P7, P8 and P9.

A voltage dropped across the resistor R13 is negatively fed back and an output of the voltage-current conversion circuit is output to the gate of N6 and therefore as a result the voltage dropped across the resistor R13 and the divided voltage of the resistors R11 and R12 become equal to each other. Consequently, a current I2, which is proportional to the voltage Vo of the power supply output unit Vo flows through the left-hand side of the current mirror circuit 62. If the current ratio of the current mirror circuit 62 is made to be 1:1, when the MOS-FET P9 is on, the current I2 flows through the right-hand side of the current mirror circuit 62.

The current mirror circuit 63 includes the N-channel MOS-FETs N10 and N11. If the current ratio of the current mirror circuit 63 is made to be 1:1, the current I2 flows through the MOS-FET N11.

The voltage-current conversion circuit 64 includes the P-channel MOS-FETs P23 and P24, the N-channel MOS-FETs N21, N22, N25 and N26 and the resistor R23, and the divided output voltage of the resistors R21 and R22 is non-invertedly input thereinto and the voltage dropped across the resistor R23 is invertedly input thereinto.

The current mirror circuit 65 includes the P-channel MOS-FETs P27, P28, P29 and P30.

A voltage dropped across the resistor R23 is negatively fed back and an output of the voltage-current conversion circuit 64 is output to the gate of N26 and therefore as a result the voltage of the resistor R23 and the divided voltage of the resistors R21 and R22 become equal to each other. Consequently, a current I1, which is proportional to the voltage Vi of the power supply input unit Vi flows through the left-hand side of the current mirror circuit 65. If the current ratio of the current mirror circuit 65 is made to be 1:1, when the MOS-FET P29 or P30 is on, the current I1 flows through the right-hand side of the current mirror circuit 65.

The capacitor C31 is charged with the current I1 in the on period of the MOS-FET P30, and is discharged with a current (I2−I1) in the on periods of the MOS-FETs P29 and P9. The voltage of the capacitor C31 is output as the PCTL signal.

The relationship between the PGATE signal, the NGATEB signal, the states of the MOS-FETs P9, P29 and P30 and the states of the main switch element Q21 and the sub switch element Q22 illustrated in FIG. 9 and the current flowing through the capacitor C31 of the sub switch control signal generating circuit 80 illustrated in FIG. 10 is as follows.

TABLE 2

| PGATE | NGATEB | Q21 | Q22 | P9  | P29 | P30 | C31 Current |
|-------|--------|-----|-----|-----|-----|-----|-------------|
| H     | L      | on  | off | off | off | on  | I1          |
| L     | H      | off | on  | on  | on  | off | I1−I2       |

Therefore, the capacitor C31 is charged with a current −I1 in the on period of the main switch element Q21 and the capacitor C31 is charged with a current I1−I2 (discharged with I2−I1) in the on period of the sub switch element Q22.

Figure 11A:
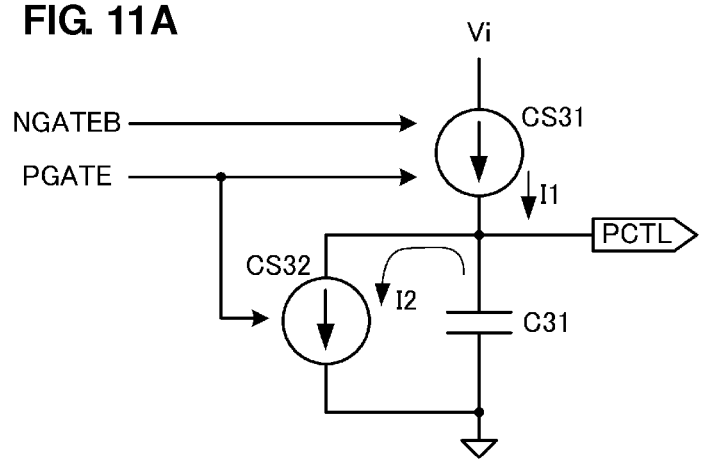
FIG. 11A illustrates in a simplified manner a circuit that charges and discharges a capacitor C31 illustrated in FIG. 10.

FIG. 11A illustrates in a simplified manner a circuit that charges and discharges the capacitor C31 illustrated in FIG.

10. In FIG. 11A, the current supply CS32 is a circuit including the voltage-current conversion circuit 61 and the current mirror circuits 62 and 63 illustrated in FIG. 10 and is turned on when the PGATE signal is at the L level. In addition, the current supply CS31 is a circuit including the voltage-current conversion circuit 64 and the current mirror circuit 65 illustrated in FIG. 10 and is turned on when the PGATE signal or the NGATEB signal is at the L level.

The current I1 is proportional to Vi and the current I2 is proportional to Vo and therefore the potential of the capacitor C31 increases with a slope that is proportional to the current I1 in the on period of the main switch element Q21 and the charging potential of the capacitor C31 decreases with a slope that is proportional to I1−I2 in the on period of the sub switch element Q22.

Figure 11B:
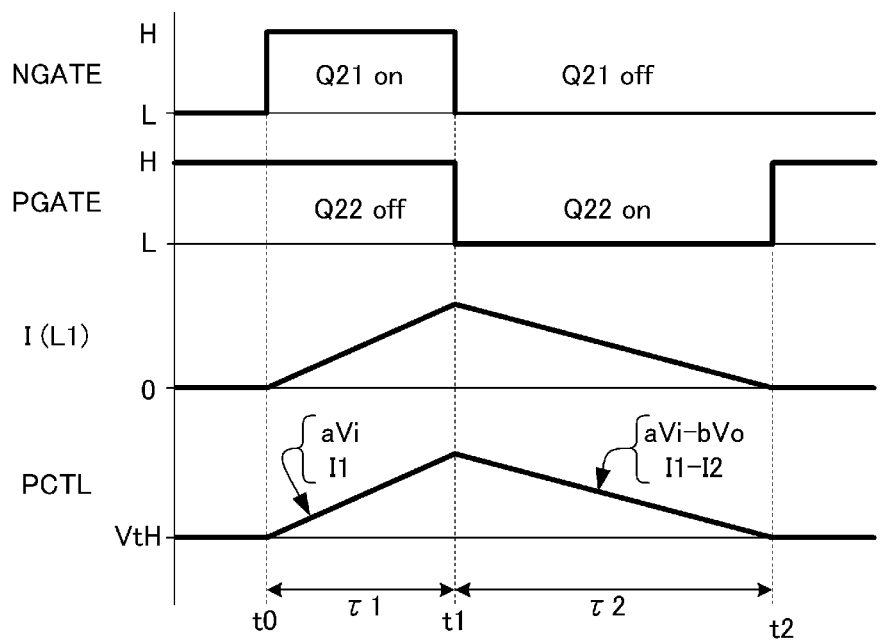
FIG. 11B is a waveform diagram of a PGATE signal, an NGATE signal, a current I(L1) flowing through an inductor L1 and an PCTL signal.

FIG. 11B is a waveform diagram of a PGATE signal, an NGATE signal, the current I(L1) flowing through the inductor L1 and a PCTL signal.

At time t0, when the NGATE signal changes to the H level, the main switch element Q21 is turned on. In a time period τ1, in which the NGATE signal is at the H level, a current flowing through the inductor L1 increases. If the initial value of the charging voltage of the capacitor C31 illustrated in FIG. 10 and FIG. 11A is assumed to be VtH, the voltage of the capacitor C31 increases from VtH in the on period τ1 of the main switch element Q21.

After that, at time t1, when the NGATE signal changes to the L level (NGATEB signal changes to the H level) and the PGATE signal changes to the L level, the main switch element Q21 is turned off and the sub switch element Q22 is turned on. In a period τ2 in which the NGATE signal is at the L level (NGATEB signal is at the H level), a current flowing through the inductor L1 decreases. In addition, the charging voltage of the capacitor C31 continuously decreases from the voltage that existed at time t1.

At time t2, when the voltage of the capacitor C31 has decreased to below VtH, the PCTL signal substantially changes to the L level and as a result the sub switch element Q22 is forcibly turned off. Therefore, reverse flow of the inductor current is prevented with a=b. In addition, similarly to the first preferred embodiment, a may instead be greater than b.

Sixth Preferred Embodiment

Figure 12:
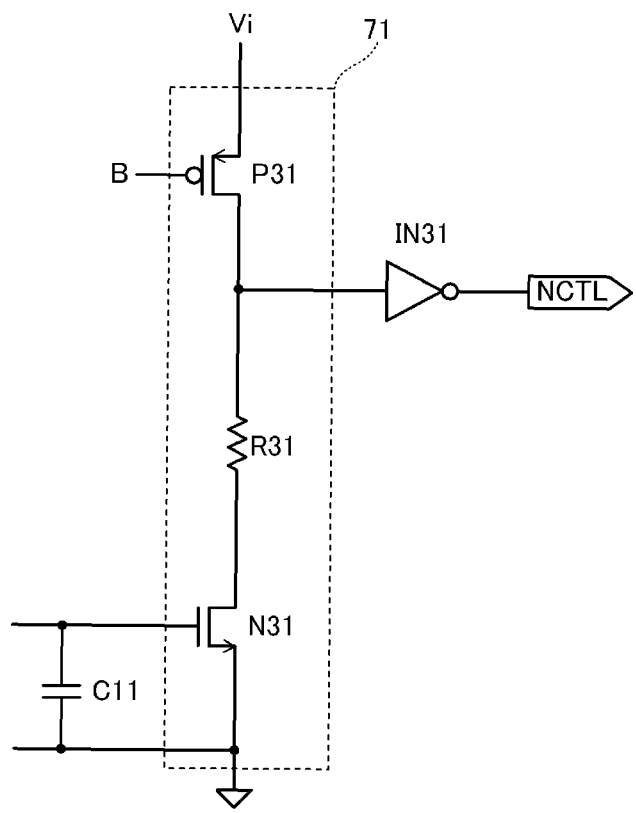
FIG. 12 illustrates the structure of portion of a sub switch control signal generating circuit of a DC-DC converter of a sixth preferred embodiment of the present invention.
Figure 13:
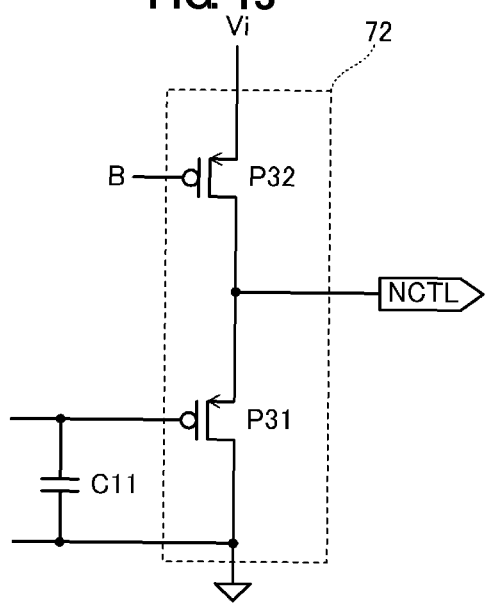
FIG. 13 illustrates the structure of portion of a sub switch control signal generating circuit of another DC-DC converter of the sixth preferred embodiment of the present invention.

FIG. 12 and FIG. 13 illustrate the structure of portion of a sub switch control signal generating circuit of a DC-DC converter of a sixth preferred embodiment of the present invention. In the above-described preferred embodiments, examples were described in which the voltage of a capacitor (C11, C21, C31 or C41), which changes as the capacitor is charged and discharged, preferably is used as the sub switch control signal (NCTL signal or PCTL signal). In the sixth preferred embodiment, an example will be described in which the voltage of a capacitor is level shifted to generate a sub switch control signal.

FIG. 12 illustrates a section in which a level shifting circuit 71 and an inverter (NOT gate) IN31 are connected to a capacitor C11. The capacitor C11 corresponds to the capacitor C11 illustrated in FIG. 3 in the first preferred embodiment. The level shifting circuit 71, as illustrated in FIG. 12 includes a MOS-FET P31, a resistor R31 and a MOS-FET N31. A fixed DC bias voltage B is applied to the gate of the high-side MOS-FET P31 so as to turn the MOS-FET P31 on. In the level shifting circuit 71, the voltage of the capacitor C11 is input to the gate of the MOS-FET N31 and a level-shifted voltage is output from a connection point between the MOS-FET P31 and the resistor R31. In this example, the inverter (NOT gate) IN31 is connected downstream of the level shifting circuit 71 and the output of the inverter IN31 serves as the NCTL signal.

In addition, FIG. 13 illustrates a section in which a level shifting circuit 72 is connected to a capacitor C11. The capacitor C11 corresponds to the capacitor C11 illustrated in FIG. 3 in the first preferred embodiment. The level shifting circuit 72 includes the MOS-FETs P31 and P32. A fixed DC bias voltage B is applied to the gate of the high-side MOS-FET P32 so as to turn the MOS-FET P32 on. The level shifting circuit 72 is structured such that the voltage of the capacitor C11 is input to the gate of the MOS-FET P31 and a level-shifted NCTL signal is output from a connection point between the MOS-FETs P31 and P32.

With this structure, even though the change in the voltage of the capacitor C11 due to charging/discharging is small, a level shift can be performed to change to a voltage that exceeds a threshold necessary to cause a downstream logic circuit to undergo a state transition. Consequently, the value of the current of a current supply used in charging and discharging a capacitor and the area of the capacitor can be made small, a circuit can be reduced in size and power consumption can be reduced.

In FIG. 12 and FIG. 13, examples are illustrated in which the capacitor C11 is provided on the ground potential side, but a configuration may instead be adopted in which the capacitor is provided on the power supply potential side and a voltage that is lower than the power supply voltage by the voltage of the capacitor is subjected to level shifting.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A DC-DC converter comprising:
a power supply input unit to which a direct current voltage is input;
a power supply output unit from which a direct current voltage is output;
a series circuit including a main switch element and a sub switch element;
an inductor including an end connected to a connection point between the main switch element and the sub switch element; and
a capacitor that is connected to the power supply output unit; wherein
the DC-DC converter is arranged to perform conversion on a DC voltage input to the power supply input unit and supply a DC voltage to a load connected to the power supply output unit;
the DC-DC converter further comprises:
a drive circuit that outputs a drive signal to the main switch element and the sub switch element;
a pulse generating circuit that outputs a pulse signal to the drive circuit; and
a sub switch control signal generating circuit that generates a sub switch control signal to prevent reverse flow of a current through the inductor at a time of a light load; wherein
the sub switch control signal generating circuit includes a detection capacitor, a charging/discharging circuit that charges/discharges the detection capacitor in accordance with switching periods of the main switch element and the sub switch element, and a sub switch control signal output circuit that outputs the sub switch control signal based on a potential of the detection capacitor.

2. The DC-DC converter according to claim 1, wherein the sub switch control signal output circuit includes a level shifting circuit that is input with a potential of the detection capacitor and outputs a level-shifted voltage signal.

3. The DC-DC converter according to claim 1, wherein the sub switch control signal output circuit includes a logic circuit that converts a voltage signal of the detection capacitor into a logic level signal and outputs the logic level signal as the sub switch control signal.

4. The DC-DC converter according to claim 2, wherein the sub switch control signal output circuit includes a logic circuit that converts a voltage signal of the detection capacitor into a logic level signal and outputs the logic level signal as the sub switch control signal.

5. The DC-DC converter according to claim 1, wherein
a smoothing circuit including the inductor and the capacitor is connected between a connection point between the main switch element and the sub switch element, and the power supply output unit;
the DC-DC converter further comprises a first current supply that generates a current that is substantially proportional to Vi and a second current supply that generates a current that is substantially proportional to Vo, where a voltage input to the power supply input unit is denoted by Vi and a voltage output from the power supply output unit is denoted by Vo; and
the first current supply and the second current supply are connected such that a potential of the detection capacitor changes in a first direction with a difference in current between the first current supply and the second current supply in an on period of the main switch element and a potential of the detection capacitor changes in a second direction with a current of the second current supply in an on period of the sub switch element.

6. The DC-DC converter according to claim 2, wherein
a smoothing circuit including the inductor and the capacitor is connected between a connection point between the main switch element and the sub switch element, and the power supply output unit;
the DC-DC converter further comprises a first current supply that generates a current that is substantially proportional to Vi and a second current supply that generates a current that is substantially proportional to Vo, where a voltage input to the power supply input unit is denoted by Vi and a voltage output from the power supply output unit is denoted by Vo; and
the first current supply and the second current supply are connected such that a potential of the detection capacitor changes in a first direction with a difference in current between the first current supply and the second current supply in an on period of the main switch element and a potential of the detection capacitor changes in a second direction with a current of the second current supply in an on period of the sub switch element.

7. The DC-DC converter according to claim 3, wherein
a smoothing circuit including the inductor and the capacitor is connected between a connection point between the main switch element and the sub switch element, and the power supply output unit;
the DC-DC converter further comprises a first current supply that generates a current that is substantially proportional to Vi and a second current supply that generates a current that is substantially proportional to Vo, where a voltage input to the power supply input unit is denoted by Vi and a voltage output from the power supply output unit is denoted by Vo; and
the first current supply and the second current supply are connected such that a potential of the detection capacitor changes in a first direction with a difference in current between the first current supply and the second current supply in an on period of the main switch element and a potential of the detection capacitor changes in a second direction with a current of the second current supply in an on period of the sub switch element.

8. The DC-DC converter according to claim 4, wherein
a smoothing circuit including the inductor and the capacitor is connected between a connection point between the main switch element and the sub switch element, and the power supply output unit;
the DC-DC converter further comprises a first current supply that generates a current that is substantially proportional to Vi and a second current supply that generates a current that is substantially proportional to Vo, where a voltage input to the power supply input unit is denoted by Vi and a voltage output from the power supply output unit is denoted by Vo; and
the first current supply and the second current supply are connected such that a potential of the detection capacitor changes in a first direction with a difference in current between the first current supply and the second current supply in an on period of the main switch element and a potential of the detection capacitor changes in a second direction with a current of the second current supply in an on period of the sub switch element.

9. The DC-DC converter according to claim 5, wherein a is substantially equal to or smaller than b, where a voltage-current conversion rate of the second current supply is denoted by a and a voltage-current conversion rate of the first current supply is denoted by b.

10. The DC-DC converter according to claim 6, wherein a is substantially equal to or smaller than b, where a voltage-current conversion rate of the second current supply is denoted by a and a voltage-current conversion rate of the first current supply is denoted by b.

11. The DC-DC converter according to claim 7, wherein a is substantially equal to or smaller than b, where a voltage-current conversion rate of the second current supply is denoted by a and a voltage-current conversion rate of the first current supply is denoted by b.

12. The DC-DC converter according to claim 8, wherein a is substantially equal to or smaller than b, where a voltage-current conversion rate of the second current supply is denoted by a and a voltage-current conversion rate of the first current supply is denoted by b.

13. The DC-DC converter according to claim 1, wherein
the inductor is connected between a connection point between the main switch element and the sub switch element, and the power supply input unit; and
the DC-DC converter further comprises a first current supply that generates a current that is substantially proportional to Vi and a second current supply that generates a current that is substantially proportional to Vo, where a voltage input to the power supply input unit is denoted by Vi and a voltage output from the power supply output unit is denoted by Vo;
the first current supply and the second current supply are connected such that a potential of the capacitor changes in a first direction with a current of the first current supply in an on period of the main switch element and a potential of the capacitor changes in a second direction with a difference in current between the first current supply and the second current supply in an on period of the sub switch element.

14. The DC-DC converter according to claim 2, wherein
the inductor is connected between a connection point between the main switch element and the sub switch element, and the power supply input unit; and
the DC-DC converter further comprises a first current supply that generates a current that is substantially proportional to Vi and a second current supply that generates a current that is substantially proportional to Vo, where a voltage input to the power supply input unit is denoted by Vi and a voltage output from the power supply output unit is denoted by Vo;
the first current supply and the second current supply are connected such that a potential of the capacitor changes in a first direction with a current of the first current supply in an on period of the main switch element and a potential of the capacitor changes in a second direction with a difference in current between the first current supply and the second current supply in an on period of the sub switch element.

15. The DC-DC converter according to claim 3, wherein
the inductor is connected between a connection point between the main switch element and the sub switch element, and the power supply input unit; and
the DC-DC converter further comprises a first current supply that generates a current that is substantially proportional to Vi and a second current supply that generates a current that is substantially proportional to Vo, where a voltage input to the power supply input unit is denoted by Vi and a voltage output from the power supply output unit is denoted by Vo;
the first current supply and the second current supply are connected such that a potential of the capacitor changes in a first direction with a current of the first current supply in an on period of the main switch element and a potential of the capacitor changes in a second direction with a difference in current between the first current supply and the second current supply in an on period of the sub switch element.

16. The DC-DC converter according to claim 4, wherein
the inductor is connected between a connection point between the main switch element and the sub switch element, and the power supply input unit; and
the DC-DC converter further comprises a first current supply that generates a current that is substantially proportional to Vi and a second current supply that generates a current that is substantially proportional to Vo, where a voltage input to the power supply input unit is denoted by Vi and a voltage output from the power supply output unit is denoted by Vo;
the first current supply and the second current supply are connected such that a potential of the capacitor changes in a first direction with a current of the first current supply in an on period of the main switch element and a potential of the capacitor changes in a second direction with a difference in current between the first current supply and the second current supply in an on period of the sub switch element.

17. The DC-DC converter according to claim 13, wherein a is substantially equal to or smaller than b, where a voltage-current conversion rate of the second current supply is denoted by a and a voltage-current conversion rate of the first current supply is denoted by b.

18. The DC-DC converter according to claim 14, wherein a is substantially equal to or smaller than b, where a voltage-current conversion rate of the second current supply is denoted by a and a voltage-current conversion rate of the first current supply is denoted by b.

19. The DC-DC converter according to claim 15, wherein a is substantially equal to or smaller than b, where a voltage-current conversion rate of the second current supply is denoted by a and a voltage-current conversion rate of the first current supply is denoted by b.

20. The DC-DC converter according to claim 16, wherein a is substantially equal to or smaller than b, where a voltage-current conversion rate of the second current supply is denoted by a and a voltage-current conversion rate of the first current supply is denoted by b.

* * * * *